No. 810,880. PATENTED JAN. 23, 1906.
E. E. P. PETERY & J. O. JACKSON.
WATER BRAKE FOR POLES.
APPLICATION FILED JAN. 5, 1905.
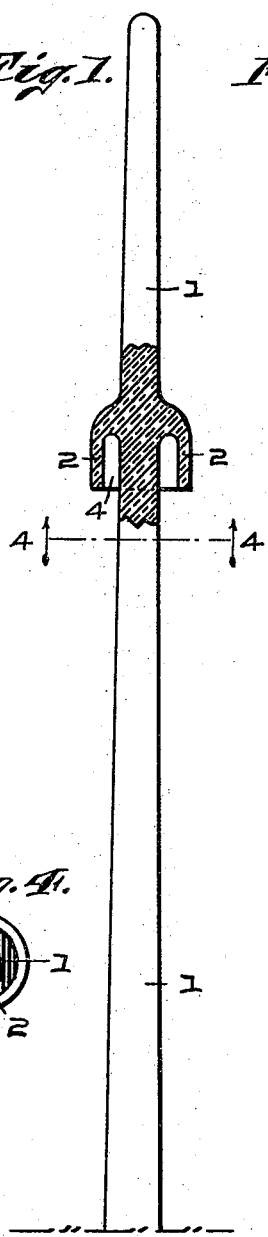
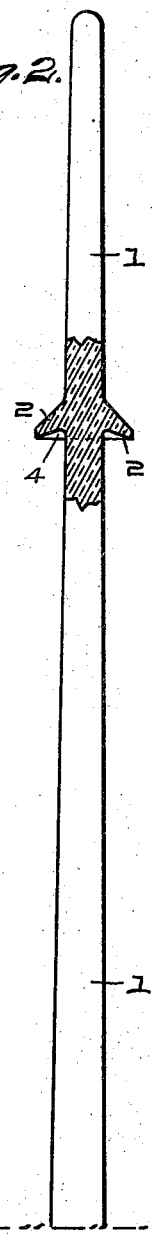
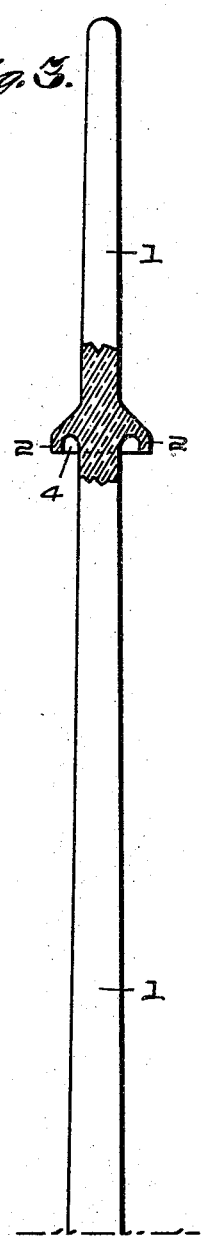
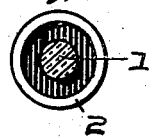
WITNESSES:
L. B. Woerner
L. Shute.
INVENTORS
Evan E. P. Petery,
and James O. Jackson,
By Minturn & Woerner,
ATTORNEYS.

UNITED STATES PATENT OFFICE.

EVAN E. P. PETERY, OF INDIANAPOLIS, AND JAMES O. JACKSON, OF SWAYZEE, INDIANA; SAID JACKSON ASSIGNOR TO SAMUEL BOWSHER.

WATER-BRAKE FOR POLES.

No. 810,880.  Specification of Letters Patent.  Patented Jan. 23, 1906.

Application filed January 5, 1905. Serial No. 239,823.

*To all whom it may concern:*

Be it known that we, EVAN E. P. PETERY, residing at Indianapolis, in the county of Marion, and JAMES O. JACKSON, residing at Swayzee, in the county of Grant, State of Indiana, citizens of the United States, have invented certain new and useful Improvements in Water-Brakes for Poles, of which the following is a specification.

This invention relates to an improvement in a water-brake for poles employed for carrying wires for conducting electric currents.

Losses are constantly sustained by all companies that generate and transmit electricity, which loss is most prevalent during damp weather, when the wood pole becomes saturated with water, which is highly conducive for the transmission of the current. Recent tests made by some of the large traction companies throughout the country disclosed the loss of almost forty per cent. of the generated current in its transmission, and the consensus of opinion attributed this great loss to the present method of insulating the wire.

The object of this invention is to overcome this leakage of current by providing a pole composed of non-conducting material having a shield or brake provided therefor that will insure at all times a circumferentially-disposed dry zone around the pole to form a barrier for the current which might otherwise be conducted down with the water shedding from the surface of the pole during rainy weather. While a pole composed of non-conducting material would generally prevent the current from reaching the ground over its surface, the shield or brake that maintains the dry annular belt around the pole will preclude further possibility of the current passing downward with the water, which will run down in a more uniform and unbroken sheet upon the surface of a pole composed of non-absorbing material than one having absorbing qualities during rainy weather.

A pole embodying our said invention in several outlines will be more particularly described in the annexed specification and the novel features thereof then pointed out in the claims.

Referring to the accompanying drawings, which are made a part hereof and on which similar numerals of reference indicate similar parts, Figure 1 is a side elevation of a pole in which that portion that contains the shield or brake is shown in section. Fig. 2 is a view similar to Fig. 1, except that it shows a somewhat different outline of the brake. Fig. 3 is a view similar to Fig. 1, except that it shows a somewhat different outline of the brake than shown in either Figs. 1 and 2. Fig. 4 is a cross-section as seen from the dotted line 4 4 in Fig. 1.

In the drawings, 1 is the pole, which is preferably composed of material which is non-conductive for the transmission of electric fluid and is specially applicable in supporting telegraph, telephone, lighting, and power wires. The pole may be made to conform to any shape in cross-section, as desired. The pole is provided somewhere between the middle and its top with a shield or water-brake 2 for directing water when it reaches said shield or water-brake away from the surface of the pole. The shield or water-brake 2 is preferably formed integrally with the pole and encircles the latter. The depending and flaring edge stands a sufficient distance away from the pole to form an annular inner air-chamber 4 between the edge and the surface of the pole. The water-brake 2 also extends downward some distance in order to protect a portion of the underlying adjacent surface of the pole from the weather. This protected annular surface of the pole is constantly kept dry, and thus presents a dry belt that prevents the electric current from flowing across the gap formed by said dry belt.

It will be seen that with the use of a pole of the character herein described the possibility of the electric current reaching the ground by means of said pole is prevented.

Having thus fully described our said inven- tion, what we desire to secure by Letters Patent is—

1. A pole composed of non-conducting material for carrying electric wires, the body, a water-brake formed integrally with the pole-body and adapted to extend circumferentially around the latter.

2. A pole composed of non-conducting material for carrying electric wires, the body, a water-brake formed integrally with the pole-body and having its lower surface cut on a plane that recedes upward and inward from the outer edge toward the pole-body.

In witness whereof we have hereunto set our hands and seals, at Indianapolis, Indiana, this 26th day of December, A. D. 1904.

EVAN E. P. PETERY. [L. S.]
JAMES O. JACKSON. [L. S.]

Witnesses:
F. W. WOERNER,
L. SHUTE.